United States Patent

Onuki et al.

[11] Patent Number: 5,360,977
[45] Date of Patent: Nov. 1, 1994

[54] COMPOUND TYPE MICROSCOPE

[75] Inventors: Tetsuji Onuki; Masatoshi Suzuki, both of Yokohama; Hiroyuki Matsushiro, Tokyo, all of Japan

[73] Assignee: Nikon Corporation, Tokyo, Japan

[21] Appl. No.: 921,129

[22] Filed: Jul. 29, 1992

[30] Foreign Application Priority Data

Aug. 8, 1991 [JP] Japan .................. 3-199465

[51] Int. Cl.$^5$ .............................. H01J 37/26
[52] U.S. Cl. .................. 250/306; 250/307; 250/216
[58] Field of Search ............ 250/306, 307, 201.1, 250/216; 73/105

[56] References Cited

U.S. PATENT DOCUMENTS

| | | | |
|---|---|---|---|
| 3,989,358 | 11/1976 | Melmoth | 350/247 |
| 4,914,293 | 4/1990 | Hayashi et al. | 250/306 |
| 4,999,495 | 3/1991 | Miyata et al. | 250/306 |
| 5,041,783 | 8/1991 | Ohta et al. | 250/306 |
| 5,083,022 | 1/1992 | Miyamoto et al. | 250/307 |
| 5,144,833 | 9/1992 | Amer et al. | 250/306 |
| 5,206,702 | 4/1993 | Kato et al. | 250/306 |

FOREIGN PATENT DOCUMENTS 0394962 10/1990 European Pat. Off. .
0406413 1/1991 European Pat. Off. .

OTHER PUBLICATIONS

Patent Abstracts of Japan, vol. 12, No. 264 (P-734), Jul. 23, 1988.
Meyer, G. et al., "Optical-Beam-Deflection Atomic Force Microscopy: The NaCl (001) Surface", *Applied Physics Letters*, vol. 56, No. 21 (1990), pp. 2100–2101.

*Primary Examiner*—Paul M. Dzierzynski
*Assistant Examiner*—Kiet T. Nguyen
*Attorney, Agent, or Firm*—Shapiro and Shapiro

[57] ABSTRACT

A compound type microscope is provided which can observe the measurement sample of an atomic force microscope (AFM) by means of an optical microscope. This compound type microscope is comprised of an optical microscope having an objective and an observation optical system, a cantilever having a reflecting surface and detecting an atomic force, an irradiating optical system for applying a spotlight to the cantilver, a detector for detecting the displacement of reflected light caused by the displacement of the cantilever, and a sample stage for placing a sample thereon. The arrangement can be designed to accommodate the use of a scanning tunnel type microscope (STM) interchangeably with the AFM so that the sample can be measured by the STM instead of by the AFM. To this end, the probe of the STM can be detachably mountable coaxially with respect to the objective of the optical microscope, whereby the probe of the STM and the cantilever of the AFM can be selectively disposed below the objective.

35 Claims, 15 Drawing Sheets

COMPOUND TYPE MICROSCOPE

BACKGROUND OF THE INVENTION

1. Field of the Invention

This invention relates to a compound type microscope comprising a combination of a scanning tunnel type microscope (STM), an atomic force microscope (AFM) and an optical microscope.

2. Related Background Art

In recent years, there have been actively developed scanning tunnel type microscopes and atomic force microscopes in which a probe is brought close to the surface of a sample and scans the latter and a tunnel current or an atomic force acting between the probe and the sample is detected to thereby observe the minute structure of the surface of the sample.

The principle of the operation of the atomic force microscope (hereinafter referred to as the AFM) will hereinafter be described briefly with reference to FIG. 12 of the accompanying drawings. Light emitted from a light source 71 is condensed by a collimator lens 72, forms a spot on the reflecting surface of a cantilever 73 and is reflected thereby. This reflected light is received by a detector 74. A sample 75 is oscillated by a scanner 76 mounted on a Z stage 115a. The inclination of the cantilever 73 with respect to the sample 75 on a sample holder 77 caused by the atomic force is detected as a variation in the light receiving position on the detector 74. The variation in the light receiving position is converted into a variation in the relative distance between the sample 75 and the cantilever 73.

The observation area of the AFM is determined by the oscillation range of the scanner 76 and is therefore as small as several μm. Accordingly, to find a particular point on the wide sample, it is necessary to move measuring points one after another and thus, a very long time has been required for observation. Even if an attempt is made to limit the measuring points in advance by an optical microscope or the like, it has been very difficult in the prior-art AFM because of the light source 71 and the detector 74.

On the other hand, with regard to the prior-art scanning tunnel type microscope (hereinafter referred to as the STM), as shown in FIG. 13 of the accompanying drawings, there has been developed a scanning tunnel microscope of coaxial construction in which an STM scanner 116 is provided outside a visible optical system provided with the objective 112 of an optical microscope. In this microscope, a sample 117 on a Z stage 115b can first be observed by means of the image pickup device 111 of the optical microscope and the position of a probe 114 fixed to the probe holder 113 of the STM can be confirmed to thereby specify a measuring point.

Also, as shown in FIG. 14 of the accompanying drawings, there has been proposed a coaxial type scanning tunnel microscope having an STM scanner 116 disposed in a through-hole in the objective 118 of an optical microscope having a through-hole.

The AFM and STM are very similar to each other in the control method and the algorithm of observation data obtainment and therefore, as shown in FIG. 15 of the accompanying drawings, there has been developed an apparatus in which portions of the electrical control systems such as an I/V amplifier 119, a feedback circuit 120, a high voltage amplifier 121 and a display 122 are used in common. In this apparatus, only a detecting system and a driving system are changed over by switches 123 and 124, and the STM and AFM are selectively operated.

As described above, in the prior-art AFM, the observation area is several μm, and to find a particular region of several μm from a wide area such as an organismic sample, it has been necessary to move measuring ranges of several μm one after another until the desired point of the target sample is located. This has required a very long time.

Also, in a coaxial type scanning tunnel microscope wherein the prior-art STM and an optical microscope are disposed coaxially with each other, a probe has been provided in the central portion of the optical microscope and therefore, it has been difficult in terms of space to dispose the light source of the AFM and a detector.

SUMMARY OF THE INVENTION

It is a first object of the present invention to provide a compound type microscope which enables a sample to be measured by an AFM to be observed by means of an optical microscope. It is a second object of the present invention to provide a compound type microscope which can selectively use an AFM or an STM and which enables a sample for the AFM or the STM to be observed by means of an optical microscope.

In a first mode of the present invention (corresponding to the first object), a compound type microscope is provided with an optical microscope having an objective and an observation optical system, a cantilever having a reflecting surface and detecting an atomic force, an irradiating optical system for irradiating said cantilever with a spotlight, a detector for detecting the displacement of reflected light caused by the displacement of the cantilever, and a sample stage for placing a sample thereon.

In a second mode of the present invention (corresponding to the second object), a compound type microscope is constructed such that a scanning tunnel type microscope having an interchangeable probe and an optical microscope having an objective are disposed coaxially with each other and there is further provided an atomic force microscope having a cantilever, and said probe and said cantilever are selectively disposed below said objective.

In the compound type microscope provided by the first mode of the present invention, a sample placed on the sample stage can be pre-observed by means of the optical microscope having the objective and the observation optical system and the range to be observed by means of an AFM can be determined. Subsequently, the cantilever having the reflecting surface and detecting the atomic force is adjusted to the range to be observed, and a spotlight is applied from the irradiating optical system to the cantilever. The displacement of reflected light caused by the displacement of the cantilever is detected by the detector. In this compound type microscope, the range to be observed by the AFM can be predetermined by observation through the optical microscope and therefore, it becomes unnecessary to move the sample over a wide range and the observation time through the AFM can be shortened.

In the compound type microscope provided by the second mode of the present invention, the scanning tunnel type microscope having the interchangeable probe and the optical microscope having the objective are disposed coaxially with each other so that the axial direction of the probe and the axial direction of the objective may coincide with each other. Further, the atomic force microscope having the cantilever is disposed so that the cantilever may lie below the objective. Said probe and said cantilever are selectively disposed. Accordingly, when the AFM is used, the probe is removed and the cantilever is mounted, whereby the AFM and the optical microscope become usable. The sample is observed by means of the optical microscope and the AFM observation area is determined, whereafter the sample can be observed by means of the AFM. Also, when the STM is used, the cantilever is removed and the probe is mounted, whereby the sample can be observed by means of the STM and at the same time, the sample can be observed by means of the optical microscope.

In a compound type microscope provided with an STM or an AFM and an optical microscope, as in the present invention, it is preferable that a predetermined positional relation be set between the probe of the STM or the tip of the cantilever of the AFM and the optical axis of the optical microscope. For example, in a compound type microscope comprising an STM and an optical microscope, the optical axis of the optical microscope and the axis of the probe of the STM are set on the same axis, whereby a sample and the probe of the STM can be observed in the same field of view. As a result, the alignment of the probe with the sample and the observation of the tip of the probe can be accomplished easily. In a compound type microscope comprising an AFM and an optical microscope, the optical axis of the optical microscope and the tip of the cantilever of the AFM are made substantially coincident with each other, whereby it becomes possible to specify the observation area of the AFM on the sample. As a result, observation can be accomplished efficiently.

When the AFM and the STM are selectively used as in the present invention, the mounting or dismounting of the cantilever of the AFM and the probe of the STM becomes necessary as previously described. Therefore, the setting of the positional relation as above discussed could present an inconvenience, because mounting accuracy on the order of micron is needed and the work to obtain such accuracy is difficult.

To avoid such inconvenience, in the optical microscope portion of the present invention provision is made of a camera unit for taking at least a part of an image formed by the optical system of the optical microscope and making it into an observation image, and aligning means for moving the camera unit in a direction perpendicular to the direction of said optical axis. Accordingly, by the camera unit being moved in a direction perpendicular to the optical axis of the optical microscope, the image of the tip of the probe of the STM can be aligned with any position of said observation image. Also, in the same manner, the observation area of the AFM can be confirmed in the observation image of the optical microscope.

DESCRIPTION OF THE PREFERRED EMBODIMENTS

Some embodiments of the present invention will hereinafter be described with reference to the drawings.

Figure 1:
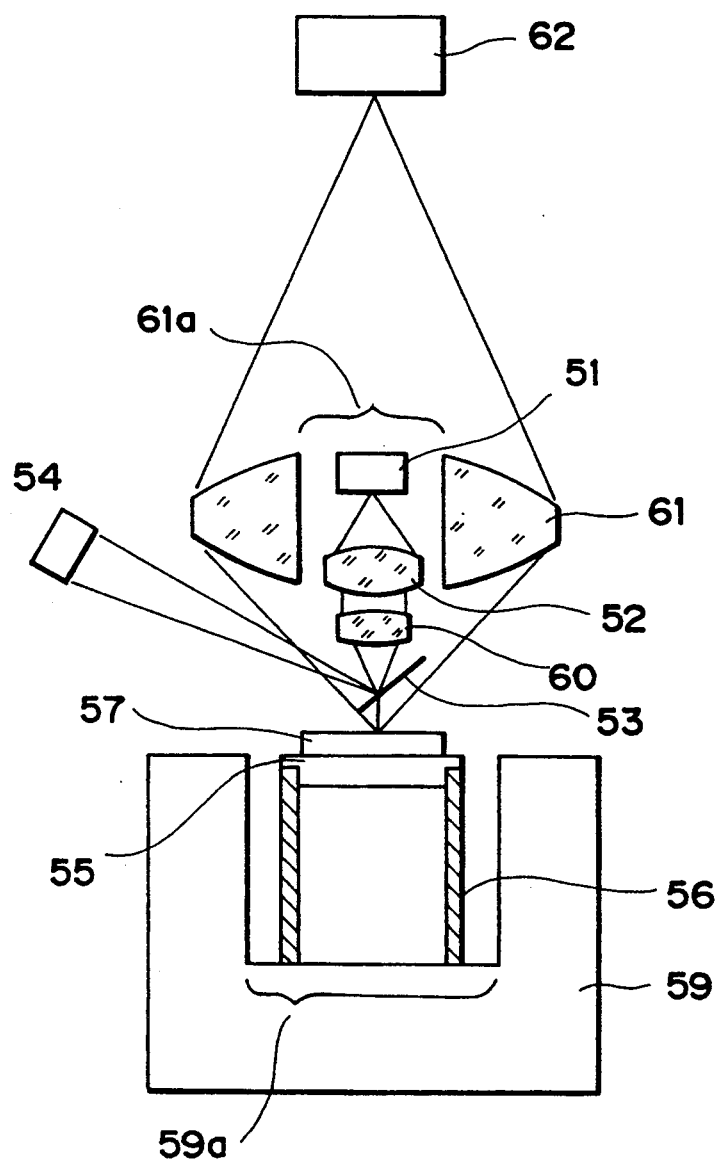
FIG. 1 shows the construction of the principal portions of a compound type microscope according to a first embodiment of the present invention.

FIG. 1 shows the construction of the principal portions of a compound type microscope according to a first embodiment of the present invention which is an example of the aforementioned first mode. The compound type microscope shown in FIG. 1 is constructed by compounding an optical microscope unit comprised chiefly of an image pickup device 62 and an objective 61, and an AFM comprised chiefly of a light source 51, a collimator lens 52, a cantilever 53, a detector 54, a scanner 56 for AFM, a sample holder 55 and a Z stage 59.

The objective 61 has a through-hole 61a in the central portion thereof, and the light source 51 and the collimator lens 52 are disposed in the through-hole 61a. Also, the Z stage 59 for bringing a sample 57 close to an area in which an atomic force acts on the cantilever 53 is formed with a recess 59a, in which the scanner 56 is disposed. The scanner 56 oscillates the sample 57 on the sample holder 55. Light emitted from the light source 52 is collimated by the collimator lens 52, whereafter it is stopped into a spot shape on the reflecting surface of the cantilever 53 by an imaging lens 60. The light is then reflected by the cantilever 53 and is received by the detector 54.

The objective 61 is disposed so that at this time, the cantilever 53 and the sample 57 may lie on the focal plane of the objective 61. Therefore, the cantilever 53 and the sample 57 can be observed by means of the optical microscope while the sample is observed by means of the AFM. The optical microscope has a mechanism (not shown) for vertically moving the objective 61, and the deviation of the cantilever 53 from the focal plane caused by the working error or the like thereof can always be adjusted to the focal plane by the mechanism for vertically moving the objective 61. The light source 51 may be directed from outside by fiber or a relay optical system.

Figure 2:
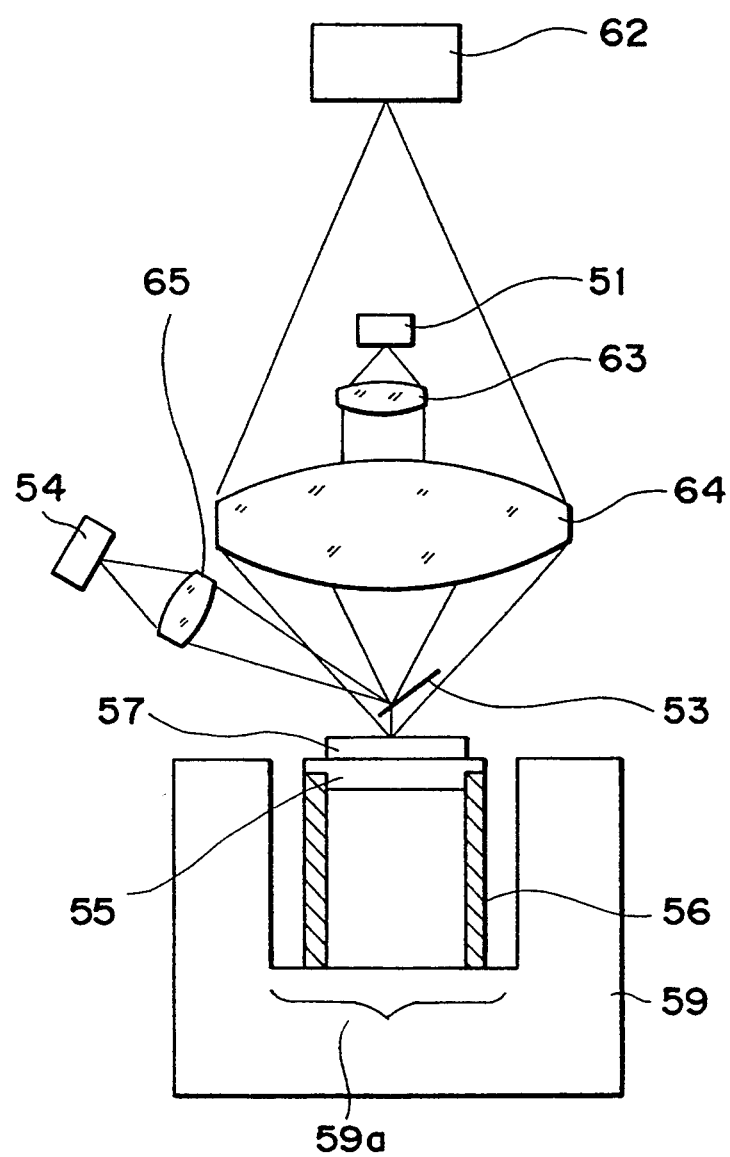
FIG. 2 shows the construction of the principal portions of a compound type microscope according to a second embodiment of the present invention.

FIG. 2 shows the construction of a second embodiment of the present invention which is another example of said first mode. The objective 64 of an optical microscope has no through-hole, and an AFM having a light source 51 and collimator lens 63 disposed above the objective 64 uses the objective 64 of the optical microscope as a portion of the lens system. Light emitted from the light source 51 is stopped into a spot shape on the reflecting surface of a cantilever 53 by the collimator lens 63 and the objective 64, is reflected by the cantilever 53, is condensed on a detector 54 by a condensing lens 65. In the other points of construction, this embodiment is similar to the compound type microscope shown in FIG. 1 and therefore need not be described further.

Figure 3:
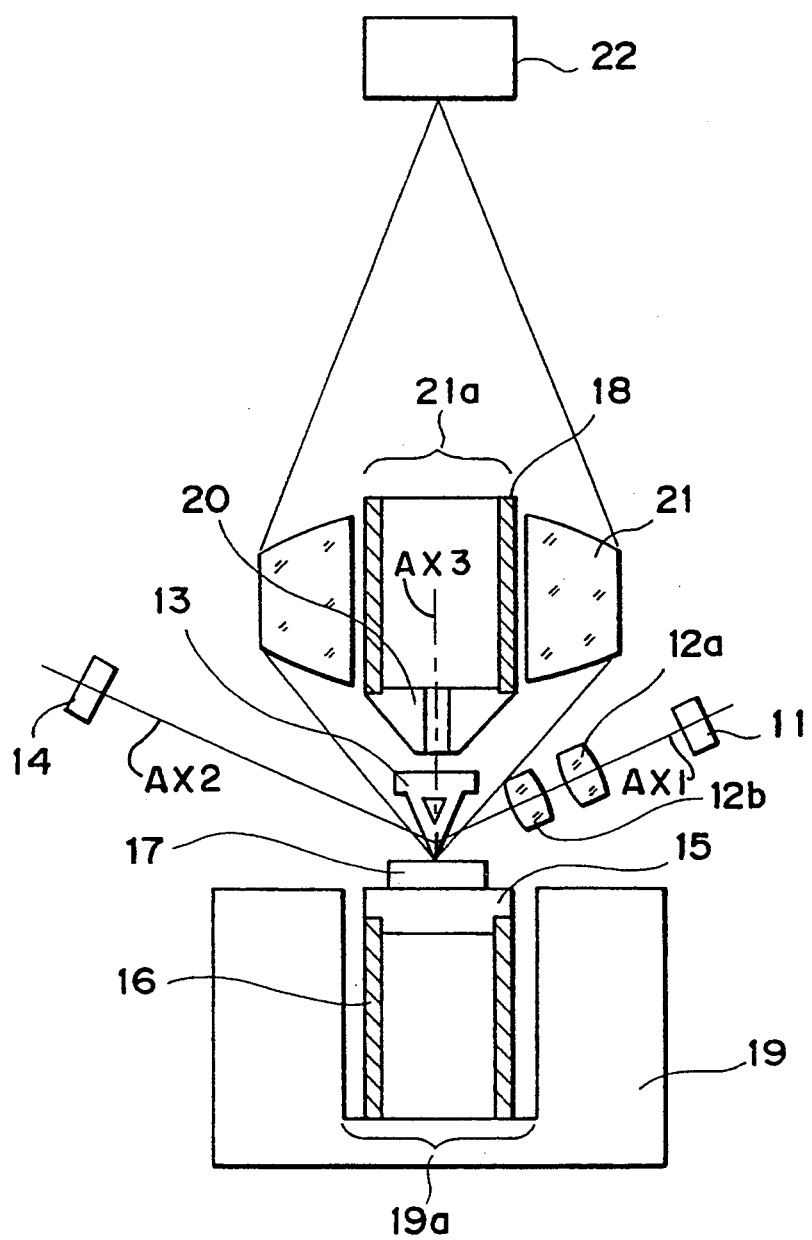
FIG. 3 shows the construction of the principal portions of a compound type microscope according to a third embodiment of the present invention when a cantilever for an AFM is mounted.
Figure 4:
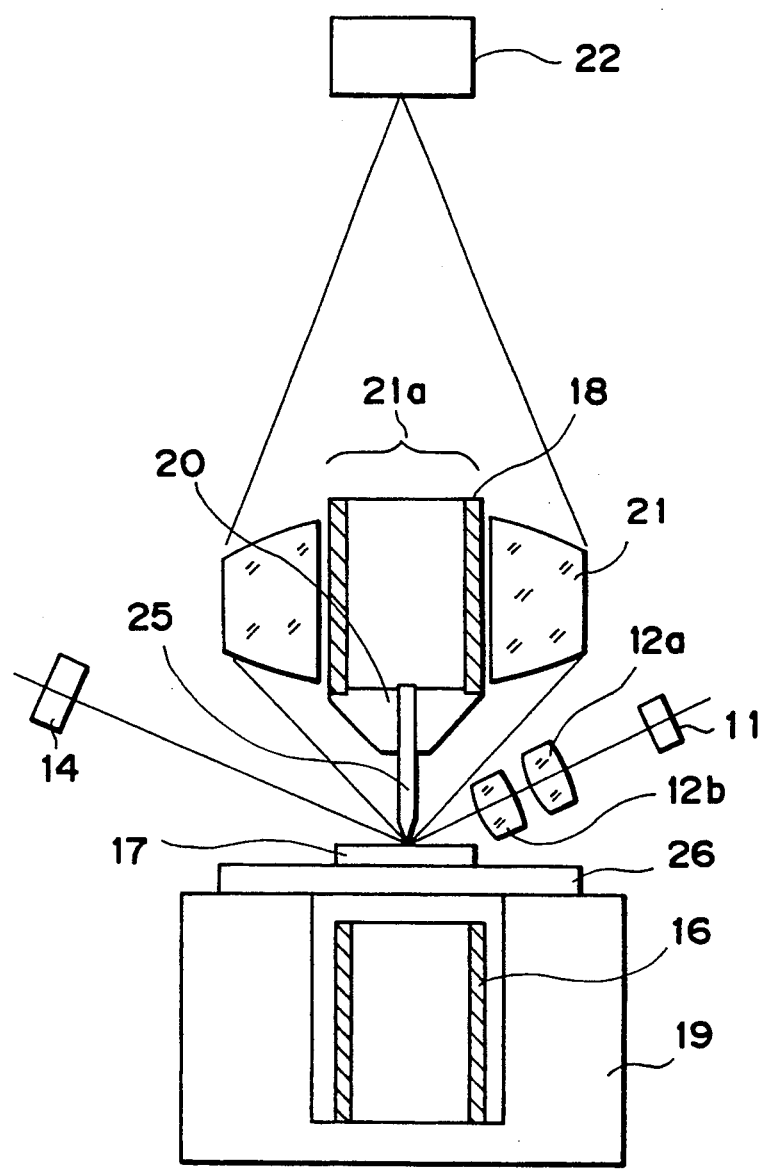
FIG. 4 shows the construction of the principal portions of the compound type microscope according to the third embodiment of the present invention when a probe for an STM is mounted.
Figure 5:
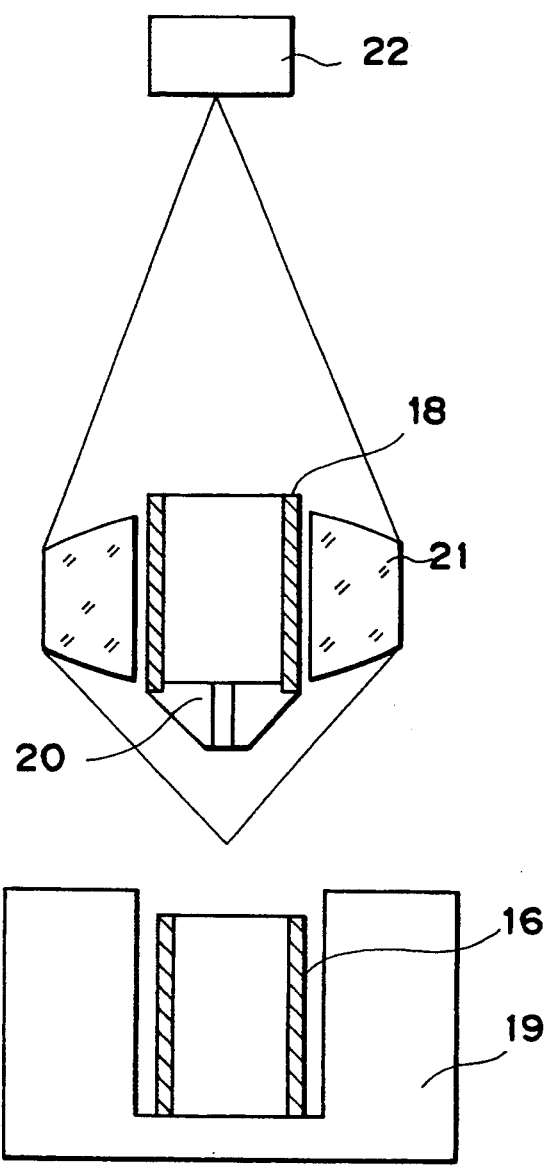
FIG. 5 shows the construction of the principal portions of the basic apparatus of the compound type microscope according to the third embodiment of the present invention.
Figure 6:
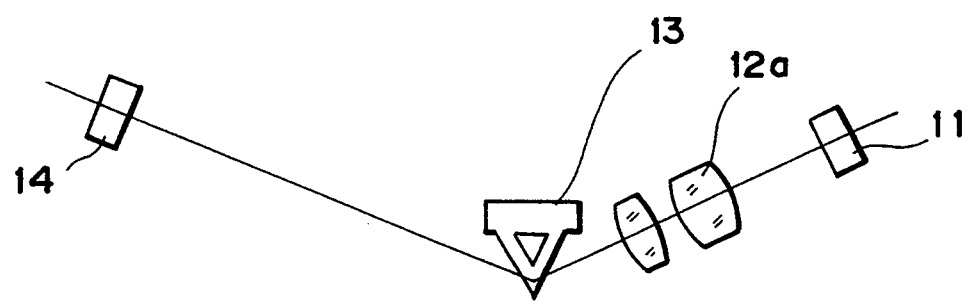
FIG. 6 shows the construction of the AFM unit of the compound type microscope according to the third embodiment of the present invention.

A compound type microscope according to a third embodiment of the present invention will now be described with reference to FIGS. 3, 4, 5 and 6. FIG. 3 shows the construction of the principal portions of the compound type microscope according to the present embodiment when a cantilever 13 for AFM is mounted. FIG. 4 shows the construction of the principal portions of the compound type microscope when a probe for STM is mounted. FIG. 5 shows the construction of the principal portions of the basic apparatus of the compound type microscope. FIG. 6 shows the construction of the AFM unit of the compound type microscope. The compound type microscope according to the present embodiment is constructed by compounding an optical microscope comprised chiefly of an image pickup device 22 and an objective 21; an STM comprised chiefly of a scanner 18 for STM, a probe holder 20 and a probe 25; and an AFM comprised chiefly of a light source 11, a collimator lens 12a, an imaging lens 12b, a cantilever 13, a detector 14, a sample holder 15 for AFM, a scanner 16 for AFM and a Z stage 19.

The objective 21 is formed with a through-hole 21a, in which a scanner 18 for STM is disposed. The scanner 18 for STM is engaged by the probe holder 20 on which the probe 25 is removably mountable. The light source 11, collimator lens 12a and imaging lens 12b for AFM are disposed to one side of cantilever 13 along an optical axis oblique with respect to the optical axis of the objective, and the detector 14 is disposed obliquely on the opposite side to the light source 11 so as to receive the reflected light from the cantilever 13. These components are made into a unit which can be mounted and dismounted with respect to the basic apparatus shown in FIG. 5. The Z stage 19 for bringing a sample 17 close to an area in which the atomic force of the sample 17 acts on the cantilever 13 is formed with a recess 19a, in which the scanner 16 for AFM is disposed. The scanner 16 for AFM oscillates the sample 17 on the sample holder 15.

The operation when observation using the AFM and the optical microscope is effected by means of the compound type microscope according to the present embodiment will now be described with reference to FIG. 3. In this case, the scanner 18 for STM is disposed in the objective 21 of the optical microscope, but it is not used during the AFM operation. The objective 21 and image pickup device 22 of the optical microscope are used both during the AFM operation and during the observation of the sample 17.

Light emitted from the light source 11 is collimated by the collimator lens 12a; whereafter it is stopped into a spot shape by the imaging lens 12b; and is applied to the cantilever 13 for AFM disposed at a location where the probe for STM would be disposed if used. The reflected light from the cantilever 13 is received by the detector 14. The sample 17 is placed on the sample holder 15 for AFM on the scanner 16 for AFM. At this time, the cantilever 13 and the sample 17 are on the focal plane of the objective 21 of the optical microscope so that they can be observed via the image pickup device 22. Any deviation from the focal plane caused by the working error or the like of the cantilever can always be adjusted to the focal plane by a mechanism (not shown) for vertically moving the objective 21. In FIG. 3, line AX1 denotes the optical axis of the spotlight applied to the cantilever 13, and line AX2 denotes the optical axis.

The operation when observation using the STM and the optical microscope is effected by means of the compound type microscope according to the present embodiment will now be described with reference to FIG. 4. In this case, the cantilever 13 is removed and the probe 25 for STM is mounted on the probe holder 20. The probe 25 is scanned by the scanner 18 for STM. The scanner 16 for AFM is recessed in the Z stage 19 and therefore, by placing a sample holder 26 for STM on the Z stage 19 and placing the sample 17 thereon, observation can be effected without any hindrance. Also, the scanner for AFM may be removed.

Also, the light source 11, the collimator lens 12a, the imaging lens 12b and the detector 14 for AFM may be kept mounted without any hindrance to the observation of the STM and the optical microscope. Of course, they may be removed.

During the observation of the STM, by the objective 21 being vertically moved, the focal plane thereof can be adjusted to the sample 17 and the tip of probe 25, which can then be observed via the image pickup device 22.

As described above, in the third embodiment of the present invention, the scanner 18 for STM is disposed in the through-hole 21a in the objective 21 of the optical microscope, and unless the probe 25 is mounted, space can be secured near the focus position of the optical microscope and thus, the cantilever for AFM can be disposed there.

The control systems of the AFM and the STM are substantially the same and therefore portions thereof can be used in common as earlier noted.

The scanner for AFM disposed in the recess formed in the Z stage 19 causes no hindrance during the operation of the STM.

Figure 7:
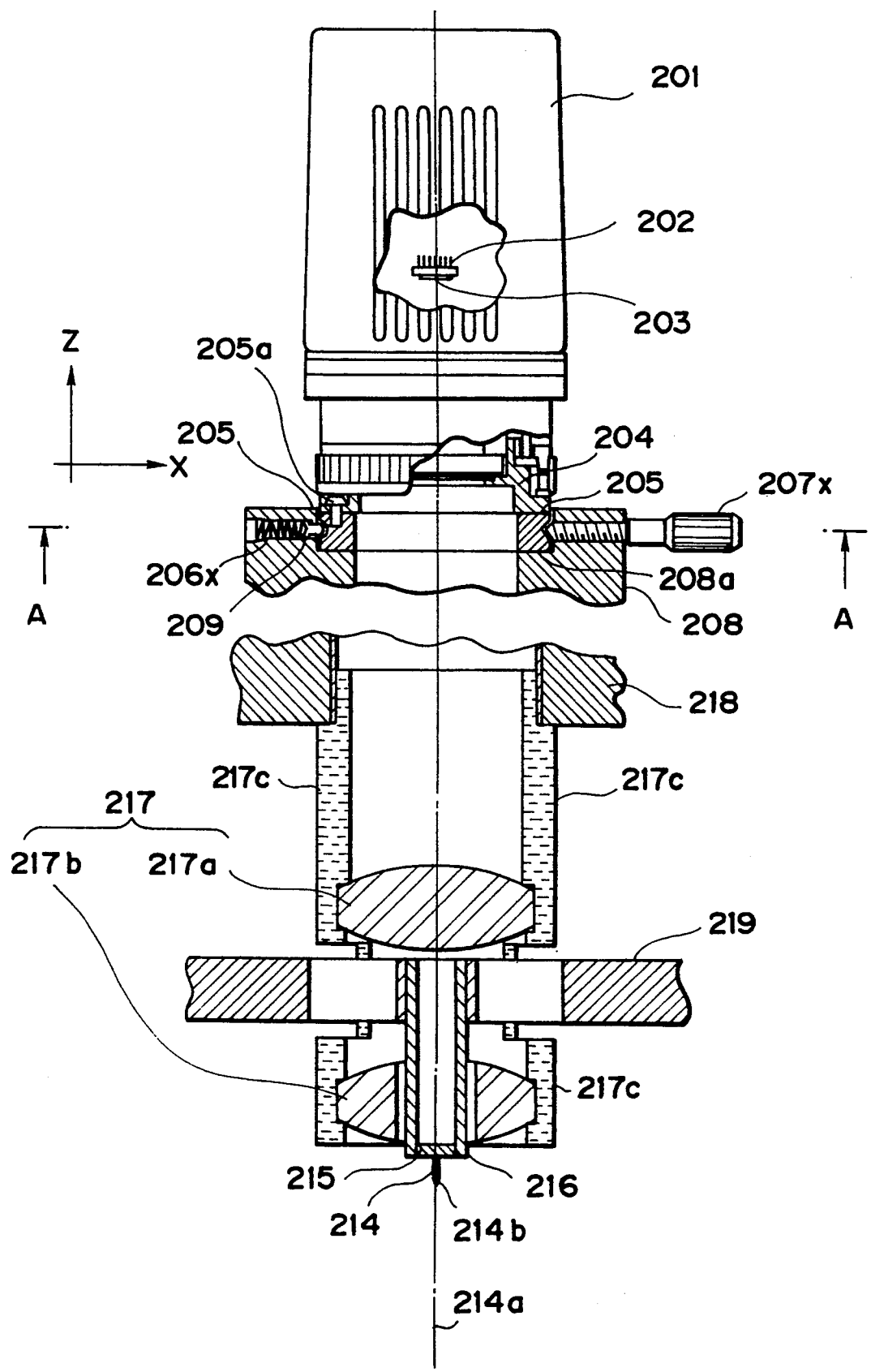
FIG. 7 is a partly cross-sectional view showing the principal portions of a compound type microscope according to a fourth embodiment of the present invention.

A fourth embodiment of the present invention will now be described with reference to FIGS. 7 and 8. FIG. 7 is a cross-sectional view showing portions of a compound type microscope according to the present embodiment, and shows a state in which a cantilever for AFM has been removed and a probe 214 for STM is mounted. On the lower portion of the compound type microscope according to the present embodiment, there are installed an object lens unit 217 comprising the objectives 217a and 217b of an optical microscope and a lens barrel 217c. The lens barrel 217c is fixed to the strut 218 of the optical microscope. A through-hole is formed in the central portion of the objective 217b, and a tube scanner 216 for STM is installed through this hole. This tube scanner 216 is mounted on the strut 219 of the STM. A probe holder 215 is mounted on the tip end of the tube scanner 216, and a probe 214 is fixed to the probe holder 215. The probe 214 is scanned by the tube scanner 216.

In the upper portion of the compound type microscope, a camera unit 201 having a CCD image pickup element 202 therein is supported on a lens barrel 208 through a camera mount 204 and an aligning member 205 to pick up a portion of an image formed by the objective unit 217. The camera mount 204 of the camera unit 201 is fixed to the aligning member 205 by a screw 205a, and the aligning member 205 is slidable on a slide surface 208a of the lens barrel 208. That is, the slide surface 208a, the camera mount 204 and the aligning member 205 together constitute the connecting portion between the lens barrel 208 and the camera unit 201.

Figure 8:
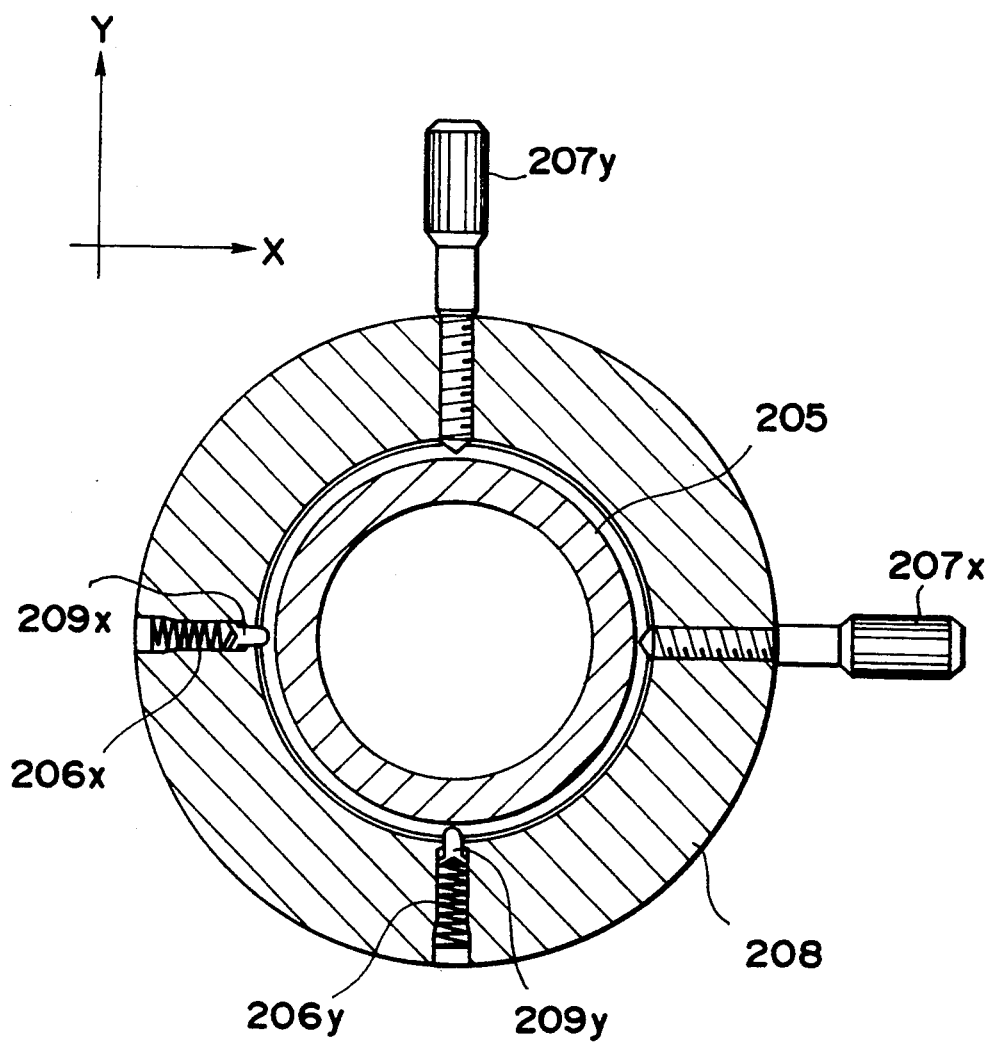
FIG. 8 is another cross-sectional view showing the principal portions of the compound type microscope according to the fourth embodiment of the present invention.

FIG. 8 is a cross-sectional view taken along line A—A of FIG. 7. As shown in FIG. 8, the aligning member 205 of the camera unit 201 has the force of a spring 206x imparted thereto by a jig 209x and is urged against a feed screw 207x provided on the opposite side. The member 205 is caused to slide in an x direction by the feeding of the feed screw 207x. Likewise, the aligning member 205 has the force of a spring 206y imparted thereto by a jig 209y and is urged against a feed screw 207y provided on the opposite side. Thus, the member 205 caused to slide in a y direction by the feeding of the feed screw 207y.

Figure 9:
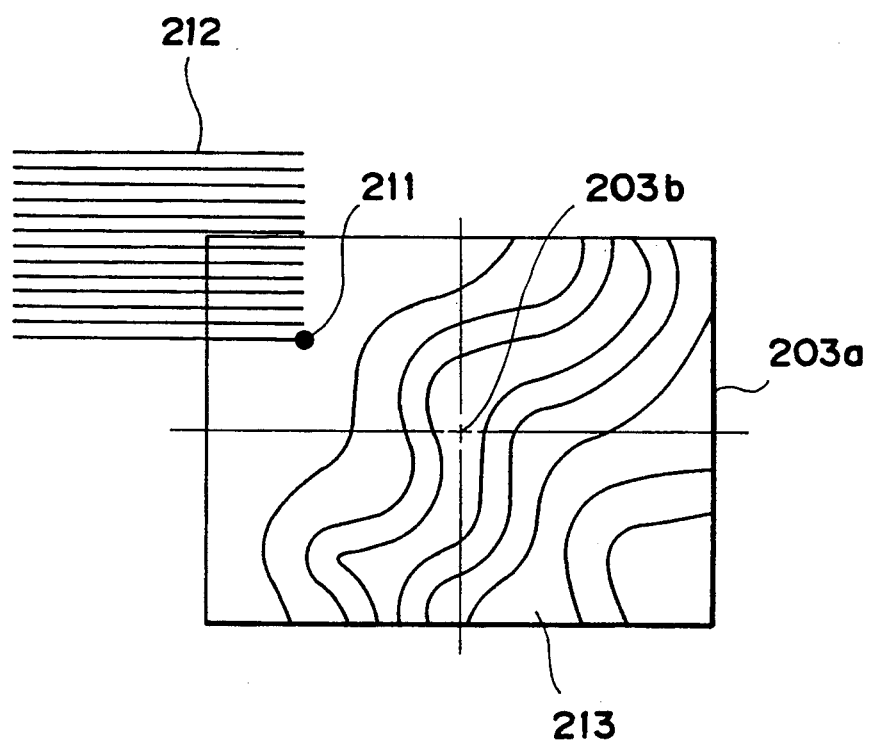
FIG. 9 is a schematic view showing the observation field and the tip of a probe in the compound type microscope according to the fourth embodiment of the present invention.

The objective unit 217 and the probe 214 are aligned so that the focus of the objective unit 217 may coincide with the tip end 214b of the probe 214. They are also aligned so that the optical axis of the objective unit 217 and the axis 214a of the probe 214 may substantially coincide with each other. The images of the tip end of the probe 214 and the surface of a sample by the objective unit 217 are formed on the image pickup surface 203 of the CCD image pickup element 202. The image formed by the objective unit 217 is larger than the image pickup area of the image pickup element 202, and the image pickup element 202 picks up a portion of the formed image, whereby the enlargement magnification of an observation image displayed is further increased. That portion of the formed image which has been picked up by the image pickup element 202 is displayed as shown in FIG. 9 by an image display device (not shown). In FIG. 9, the image 213 of the surface of the sample and the image 211 of the tip end of the probe are seen in an observation field 203a of the image pickup element. The tip end 214b of the probe 214 scans a scanning range 212 by the tube scanner 216. Accordingly, when as shown in FIG. 9, the tip end 214b of the probe 214 and the center 203b of the observation field 203a slightly deviate from each other, a part of the scanning range 212 of the probe 214 deviates from the observation field 203a, thus hindering the observation.

In the present embodiment, when, as shown in FIG. 9, the scanning range 212 of the tip end 214b of the probe 214 deviates from the observation field 203a, the above-mentioned feed screws 207x and 207y are adjusted to thereby move the camera unit 201 in the directions x and y. The image pickup element 202 in the camera unit 201 is correspondingly moved and therefore, that portion of the formed image by the objective unit 217 which is picked up is changed, whereby the scanning range 212 of the tip end 214b of the probe 214 can be kept in the observation field 203a.

Accordingly, in the compound type microscope according to the present embodiment, even if during the interchange of the probe 214, the axis 214b of the probe 214 is not made precisely coincident with the optical axis of the objective, the center 203b of the observation field and the image 211 of the tip end of the probe can be made coincident with each other by moving the camera unit 201 by the use of the feed screws 207x and 207y. Therefore, during the interchange of the probe, the operation of bringing the tip end of the probe to the center of the observation field, which has heretofore been cumbersomely performed by shifting the probe, can be accomplished easily by the use of the feed screws.

Figure 10:
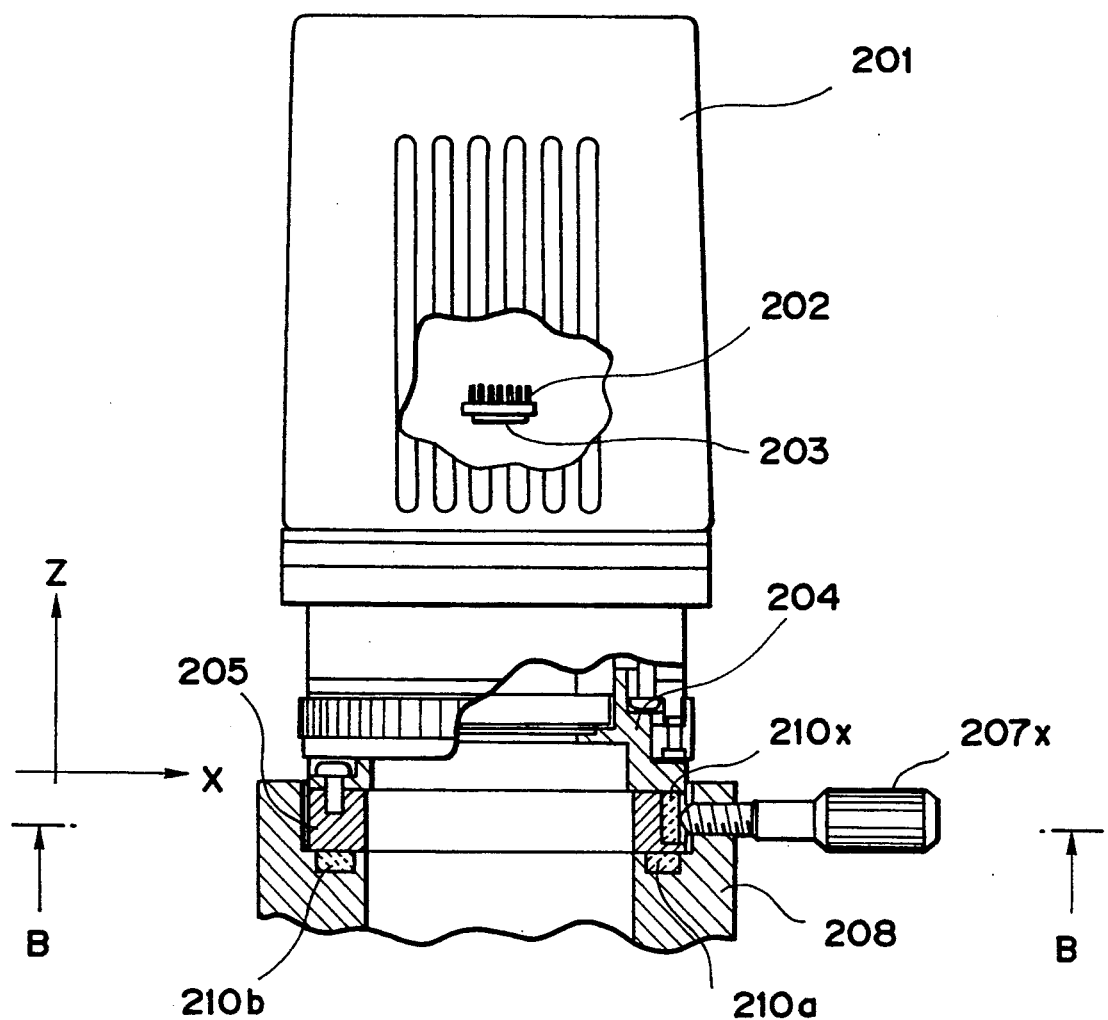
FIG. 10 is a partly cross-sectional view showing the structure of another example of the compound type microscope according to the fourth embodiment of the present invention.
Figure 11:
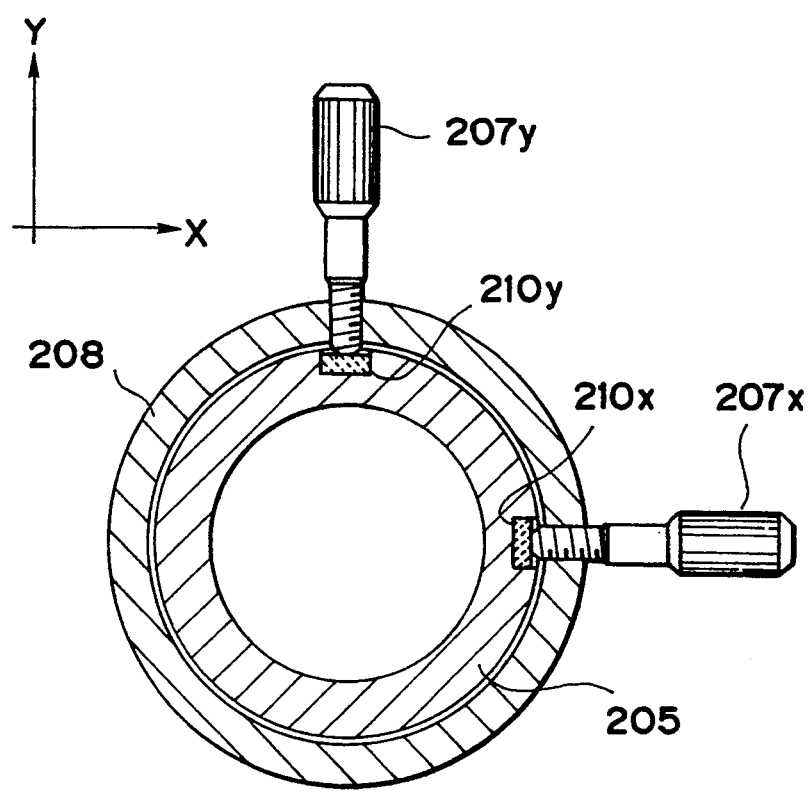
FIG. 11 is a cross-sectional view showing the structure of another example of the compound type microscope according to the fourth embodiment of the present invention.
Figure 12:
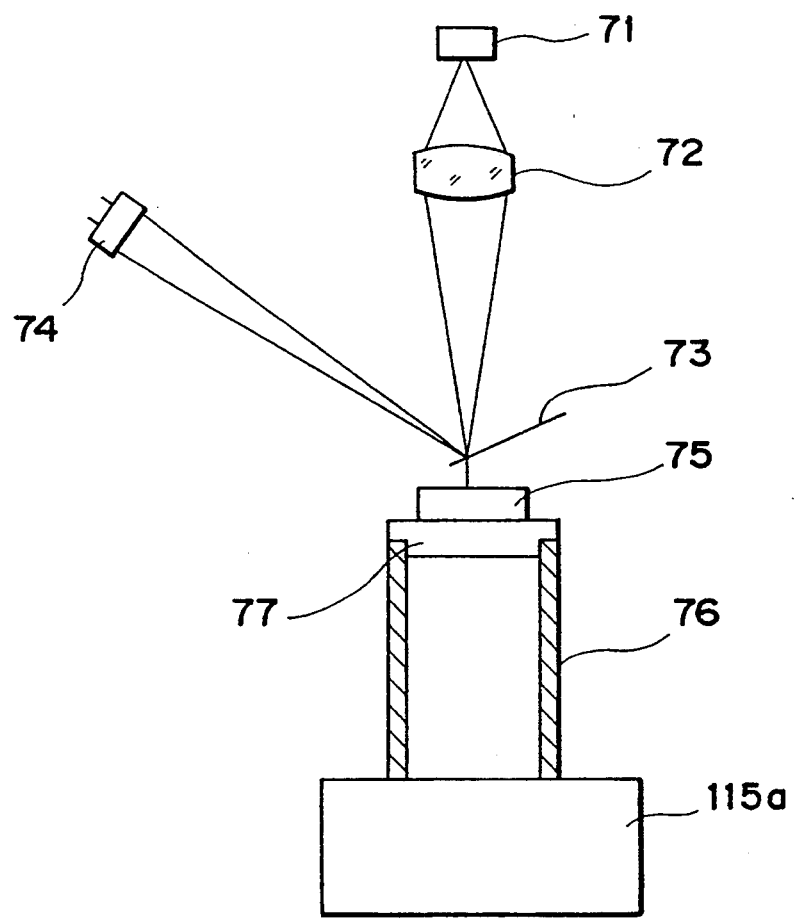
FIG. 12 shows the construction of a prior-art AFM.
Figure 13:
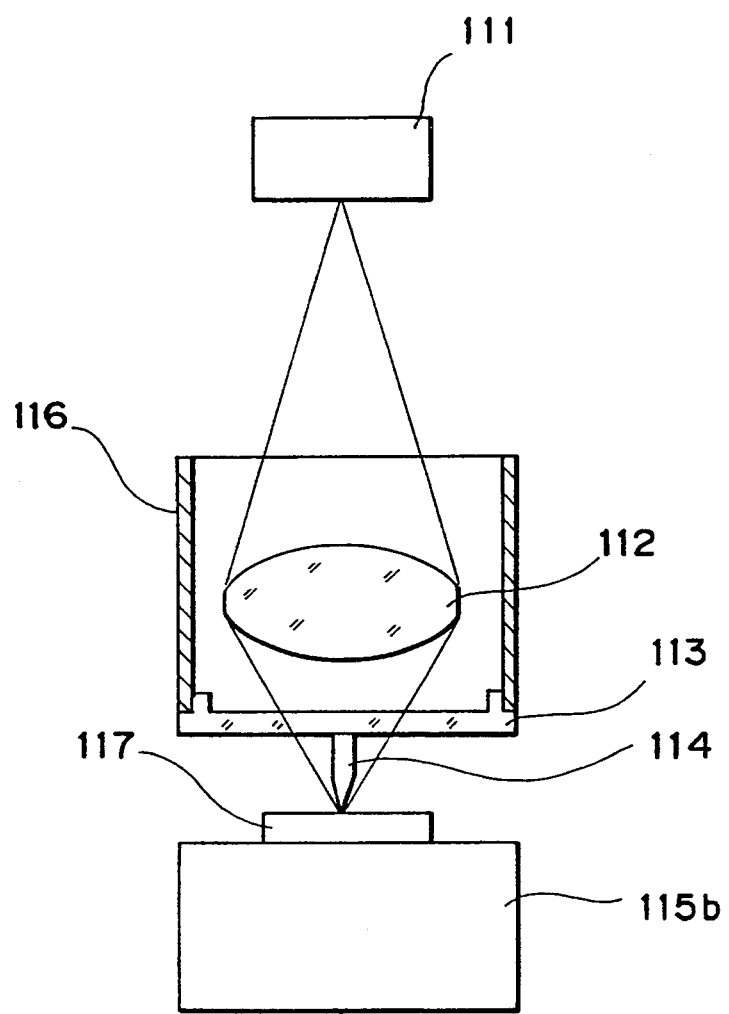
FIG. 13 shows the construction of a prior-art STM.
Figure 14:
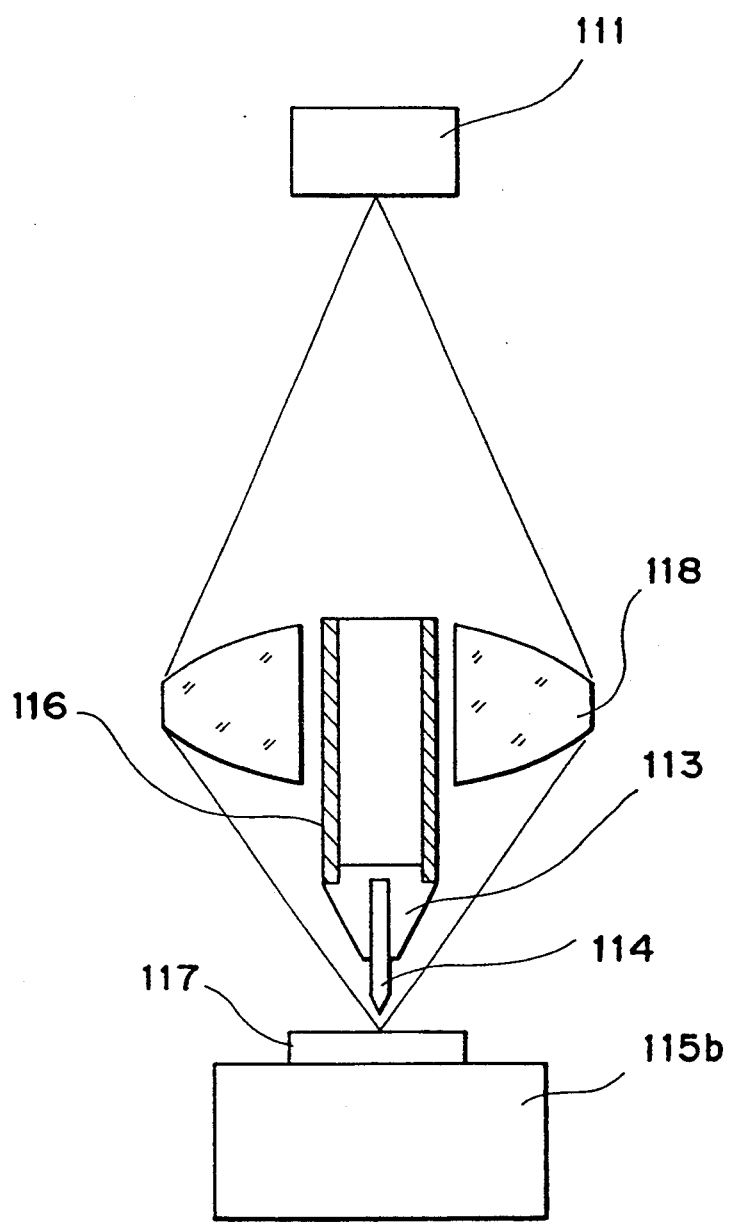
FIG. 14 shows the construction of a prior-art STM.
Figure 15:
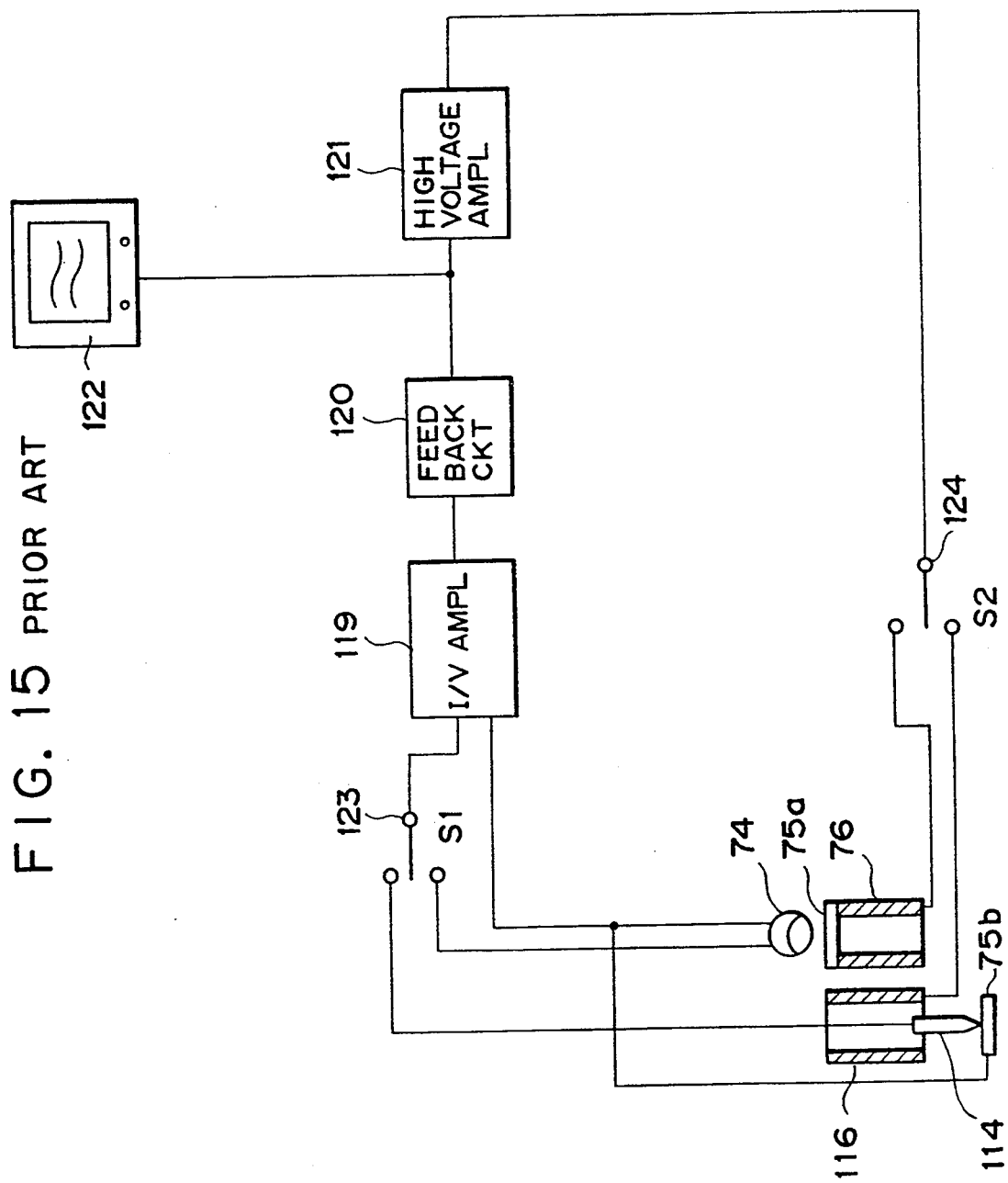
FIG. 15 shows the construction of a prior-art apparatus in which an AFM and an STM are selectively used.

Further, as shown in FIGS. 10 and 11, magnets 210x and 210y may be used instead of the springs 206, and the aligning member 205 may be connected to the feed screws 207 by the force with which the magnets 210x and 210y are attracted to the feed screws 207x and 207y. A cross-sectional view taken along line B—B of FIG. 10 is shown in FIG. 11. As shown in FIG. 11, the magnet 210x disposed in the direction x of the aligning member 205 is attracted to the feed screw 207x, thereby connecting the aligning member 205 to the feed screw 207x in the direction x. Also, the magnet 210y disposed in the direction y of the aligning member 205 is attracted to the feed screw 207y, thereby connecting the aligning member 205 to the feed screw 207y in the direction y. Accordingly, by adjusting the feed screws 207x and 207y, the camera unit 201 can be moved easily in the directions x and y.

A pair of magnets 210a and 210b of FIG. 10 attract the aligning member 205 in a direction Z to thereby bring the camera unit 201 into intimate contact with the lens barrel 208 and hold the camera unit secure. In the other points, the construction of the present embodiment is similar to that of the fourth embodiment and therefore need not be described.

According to the present embodiment, even if deviation occurs between the axis of the probe of the STM and the optical axis of the objective of the optical microscope, the image of the tip end of the probe can be easily aligned with the center of the observation field of the optical microscope.

The relation between the probe of the STM and the observation field of the optical microscope has hitherto been described, and what has been described also holds true of the case of the AFM and the optical microscope. In the case of the AFM, the tip of the cantilever cannot be seen by means of the optical microscope, but if the positions of the tip of the cantilever and the optical axis of the objective of the optical microscope are suitably set, the area that is being observed by means of the AFM can be confirmed by the observation field of the optical microscope. Accordingly, when any deviation from said set value occurs to the positional relation between the cantilever of the AFM and the optical axis of the objective, the positional relation can be easily adjusted by the feed screws as previously described.

What is claimed is:

1. A compound type microscope comprising:

an optical microscope having an objective and an observation optical system;

a sample stage for placing a sample thereon;

a cantilever for disposition near the sample, said cantilever having a reflecting surface and being displaceable for detecting an atomic force;

an irradiating optical system for applying a spotlight to said reflecting surface of said cantilever; and detection means for receiving said spotlight reflected from said reflecting surface to detect an amount of displacement of said cantilever; and wherein said irradiating optical system and said detection means are arranged such that an optical axis of said spotlight applied to said reflecting surface and an optical axis of said spotlight reflected from said reflecting surface for detection by said detection means are transverse to each other, and said detection means and said optical microscope are arranged such that said optical axis of said spotlight reflected from said reflecting surface and an optical axis of said objective of said optical microscope for observation of an image coming from a surface of the sample by said observation optical system are transverse to each other.

2. A compound type microscope according to claim 1, wherein said irradiating optical system and said objective are disposed coaxially with each other.

3. A compound type microscope according to claim 2, wherein said objective has a through-hole in a central portion thereof, and said irradiating optical system applies said spotlight to said cantilever through said through-hole.

4. A compound type microscope according to claim 3, wherein said irradiating optical system has a light source and a lens system, and at least a portion of one of said light source and said lens system is disposed in the through-hole formed in the central portion of said objective.

5. A compound type microscope according to claim 2, wherein said irradiating optical system has a light source and a lens system, said lens system being constructed so as to include said objective.

6. A compound type microscope according to claim 1, wherein said irradiating optical system is disposed so as to apply said spotlight from the outside of said optical microscope to said cantilever.

7. A compound type microscope according to claim 1, wherein said sample stage has a scanner for oscillating the sample.

8. A compound type microscope comprising:

a scanning tunnel microscope having a detachably mountable probe;

an optical microscope having an objective disposed coaxially with a mounting position of said probe; and an atomic force microscope having a cantilever mountable below said objective to replace said probe, such that said optical microscope is used in conjunction with said scanning tunnel microscope and said atomic force microscope, selectively.

9. A compound type microscope according to claim 8, further comprising:

a camera unit for making at least a portion of an image formed by said optical microscope into an observation image; and aligning means for moving said camera unit in a direction perpendicular to an axial direction of said probe.

10. A compound type microscope according to claim 9, wherein said optical microscope has:

a lens barrel formed with an opening portion;

a connecting portion for mounting said camera unit in said opening portion with clearance such that said camera unit is movable in said direction perpendicular to the axial direction of said objective; and regulating means provided in said opening portion for regulating said clearance and fixing said camera unit.

11. A compound type microscope according to claim 10, wherein said regulating means fixes said camera unit at any position relative to said lens barrel within a full range of said clearance.

12. A compound type microscope according to claim 11, wherein said regulating means is provided around said opening portion, and has a feed screw portion for moving said camera unit, and a spring portion for urging said camera unit against said feed screw portion.

13. A compound type microscope according to claim 11, wherein said regulating means is provided around said opening portion, and has a feed screw portion for moving said camera unit, and a magnet for connecting said camera unit to said feed screw portion.

14. A compound type microscope comprising:

a scanning tunnel microscope having an interchangeable probe;

an optical microscope having an objective disposed coaxially with a mounting position of said probe;

a camera unit for making at least a portion of an image formed by said optical microscope into an observation image; and aligning means for moving said camera unit in a direction perpendicular to an axial direction of said objective.

15. A compound type microscope according to claim 14, wherein said optical microscope has:

a lens barrel formed with an opening portion;

a connecting portion for mounting said camera unit in said opening portion with clearance such that said camera unit is movable in said direction perpendicular to the axial direction of said objective; and regulating means provided in said opening portion for regulating said clearance and fixing said camera unit.

16. A compound type microscope according to claim 15, wherein said regulating means fixes said camera unit at any position relative to said lens barrel within a full range of said clearance.

17. A compound type microscope according to claim 16, wherein said regulating means is provided around said opening portion, and has a feed screw portion for moving said camera unit, and a spring portion for urging said camera unit against said feed screw portion.

18. A compound type microscope according to claim 16, wherein said regulating means is provided around said opening portion, and has a feed screw portion for moving said camera unit, and a magnet for connecting said camera unit to said feed screw portion.

19. A compound type microscope comprising:

an optical microscope having an objective;

a scanning tunnel microscope; and an atomic force microscope;

wherein said scanning tunnel microscope and said atomic force microscope include a probe and a cantilever, respectively, for sample observation; and wherein said probe and said cantilever are mountable below said objective, selectively, such that said scanning tunnel microscope and said atomic force microscope are used interchangeably for sample observation in conjunction with said optical microscope.

20. A compound type microscope according to claim 19, wherein said atomic force microscope includes an irradiating optical system for applying light to a reflecting surface of said cantilever, and a detector for detecting said light reflected from said reflecting surface.

21. A compound type microscope according to claim 20, wherein said irradiating optical system and said detector are arranged such that an optical axis of said light applied to said reflecting surface and an optical axis of said light reflected from said reflecting surface for detection by said detector are transverse to each other.

22. A compound type microscope according to claim 21, wherein said detector and said optical microscope are arranged such that said optical axis of said light reflected from said reflecting surface and an optical axis of said objective of said optical microscope for observation of an image coming from a surface of a sample are transverse to each other.

23. A compound type microscope according to claim 19, further comprising:
a camera unit for making at least a portion of an image formed by said optical microscope into an observation image; and
aligning means for moving said camera unit in a direction perpendicular to an axial direction of said objective.

24. A compound type microscope according to claim 23, wherein said optical microscope has:
a lens barrel formed with an opening portion;
a connecting portion for mounting said camera unit in said opening portion with clearance such that said camera unit is movable in said direction perpendicular to the axial direction of said objective; and
regulating means provided in said opening portion for regulating said clearance and fixing said camera unit.

25. A compound type microscope according to claim 24, wherein said regulating means fixes said camera unit at any position relative to said lens barrel within a full range of said clearance.

26. A compound type microscope according to claim 25, wherein said regulating means is provided around said opening portion, and has a feed screw portion for moving said camera unit, and a spring portion for urging said camera unit against said feed screw portion.

27. A compound type microscope according to claim 25, wherein said regulating means is provided around said opening portion, and has a feed screw portion for moving said camera unit, and a magnet for connecting said camera unit to said feed screw portion.

28. A compound type microscope according to claim 19, further including a stage for mounting a sample, said stage having a recess in which a scanner of the atomic force microscope is received.

29. A compound type microscope comprising:
an optical microscope having an objective and means for receiving through said objective an optical image of a sample disposed beneath said objective; and
an atomic force microscope including a cantilever disposed near said sample beneath said objective, said cantilever having a reflecting surface and being displaceable for detecting an atomic force; an irradiating optical system for applying a spotlight to said reflecting surface of said cantilever; and detection means for receiving said spotlight reflected from said reflecting surface to detect an amount of displacement of said cantilever; and
wherein said detection means and said objective are arranged such that said spotlight reflected from said reflecting surface of said cantilever and received by said detection means does not pass through said objective.

30. A compound type microscope according to claim 29, wherein said irradiating optical system and said objective are disposed coaxially with each other.

31. A compound type microscope according to claim 30, wherein said objective has a through-hole in a central portion thereof, and said irradiating optical system applies said spotlight to said cantilever through said through-hole.

32. A compound type microscope according to claim 31, wherein said irradiating optical system has a light source and a lens system, and at least a portion of one of said light source and said lens system is disposed in the through-hole formed in the central portion of said objective.

33. A compound type microscope according to claim 30, wherein said irradiating optical system has a light source and a lens system, said lens system being constructed so as to include said objective.

34. A compound type microscope according to claim 29, wherein said irradiating optical system is disposed so as to apply said spotlight from the outside of said optical microscope to said cantilever.

35. A compound type microscope according to claim 29, further including a sample stage having a scanner for oscillating said sample.

* * * * *